(12) United States Patent
Eudes et al.

(10) Patent No.: US 7,366,256 B2
(45) Date of Patent: Apr. 29, 2008

(54) METHOD AND MODEM FOR PHASE SYNCHRONIZATION AND TRACKING

(75) Inventors: Jacques Eudes, Asnieres (FR); Cedric Demeure, Paris (FR)

(73) Assignee: Thales (FR)

( * ) Notice: Subject to any disclaimer, the term of this patent is extended or adjusted under 35 U.S.C. 154(b) by 719 days.

(21) Appl. No.: 10/702,582

(22) Filed: Nov. 7, 2003

(65) Prior Publication Data

US 2004/0105396 A1   Jun. 3, 2004

(30) Foreign Application Priority Data

Nov. 8, 2002   (FR) ................................. 02 14056

(51) Int. Cl.
    *H04L 27/00* (2006.01)
(52) U.S. Cl. ....................... 375/324; 375/375
(58) Field of Classification Search ................ 375/316, 375/324, 326, 354, 355, 356, 371, 363–369, 375/375; 370/395.62, 389, 503, 395.6

See application file for complete search history.

(56) References Cited

U.S. PATENT DOCUMENTS

| 6,510,381 B2* | 1/2003 | Grounds et al. ............ 701/207 |
| 6,522,696 B1* | 2/2003 | Mobin et al. ................ 375/262 |
| 6,535,163 B1* | 3/2003 | Sahai et al. ............. 342/357.12 |
| 6,956,839 B2* | 10/2005 | Sexton et al. ................ 370/335 |
| 2002/0034265 A1* | 3/2002 | Legrand et al. ............. 375/316 |
| 2003/0092417 A1* | 5/2003 | Fernandez-Corbaton et al. 455/323 |
| 2003/0223477 A1* | 12/2003 | Loomis et al. .............. 375/147 |

FOREIGN PATENT DOCUMENTS

| EP | 1313281 A1 | 5/2003 |
| WO | 0154287 A2 | 1/2003 |
| WO | 0030312 A1 | 2/2003 |
| WO | 0209382 A1 | 7/2003 |

* cited by examiner

*Primary Examiner*—Chieh M. Fan
*Assistant Examiner*—Freshteh N Aghdam
(74) *Attorney, Agent, or Firm*—Lowe Hauptman Ham & Berner, LLP

(57) ABSTRACT

In a method and device to demodulate a signal in a packet communications system, the signal comprises at least one burst representing data samples relative to one or more users. The method comprises at least one step of phase estimation and tracking during at least the duration of the burst in using a frequency assumption test.

9 Claims, 6 Drawing Sheets

METHOD AND MODEM FOR PHASE SYNCHRONIZATION AND TRACKING

BACKGROUND OF THE INVENTION

1. Field of the Invention

The present invention relates to a device and a method for phase synchronization and tracking in the case of transmissions.

The invention can be applied especially to the transmission of small-sized packets in satellite telecommunications, for wireless links in ground applications, for radiofrequency beam type communications etc.

The method according to the invention can be applied, for example, to all types of packet communications such as TDMA (Time Division Multiple Access), frequency hopping, bursts, etc, for a variety of radio applications (such as radiofrequency beams, satellite transmissions, short-range links in the millimeter bands etc).

It relates especially to small-sized terminals which therefore work at very low bit rates.

It can be applied to any constellation, for example of the M-QAM, M-PSK and APSK type.

2. Description of the Prior Art

The problem of synchronization of a modem in burst mode is always very difficult. The classic methods consist of the insertion of a "header" formed by symbols known to the receiver. In the symbols, a correlation is made that enables detection when a threshold is crossed. The symbols reduce the transmission efficiency because they do not contain payload information. It therefore proves to be desirable to limit their number to the maximum extent.

The use, for example, of turbocodes and recent developments in error-correction encoding, have amplified this problem. Indeed, these new codes enable a sharp reduction in the point of functioning of the error correction codes. This means that the synchronization of the modem must work in more difficult conditions (lower signal-to-noise ratio or SNR).

In satellite transmission as well as in RF transmission, the problem is especially crucial inasmuch as the propagation is good (in particular, there is neither any problem of multiple paths nor of fading). It is thus possible to hope to attain an Eb/N0 (the ratio between the energy transmitted per payload bit and the spectral noise density) type of point of functioning, equal to 2 or 3 dB, giving a C/N0 (BPSK carrier/noise) ratio in the region of 0 dB.

To resolve this problem, an estimation is made of the maximum likelihood of the reference sequence sought.

Another approach consists in using the protection provided by the error correction codes to make the method more robust by benefiting from the processing gain resulting from the error correction code. This is the approach chosen in the thesis by C. Morlet [1]« Démodulateur embarqué multiporteur pour service multimédia par satellite ENST ("Multicarrier Integrated Demodulator for Multimedia Services by Satellite", ENST, reference 000E27 obtained in September 2000" and entitled Tentative Decision. This approach however has three major drawbacks:

The synchronization depends on the code used and therefore links these two parts of the modem which are generally independent,
  The method is not very robust with respect to frequency errors,
  While it is well-adapted in the use of classic convolution waveforms, the method is more complex and difficult to use with waveforms using turbocodes. Since turbocodes work by iteration, several iterations have to be performed to obtain a sufficiently low error rate at output to enable synchronization in the feedback loop. In practice, this implies a major computation cost (in fact, the operation is limited to half an iteration or to one iteration) and also a substantial processing time, which may be crippling in terms of latency.

Satellite burst transmissions are also widely used for small stations which, owing to the power and antenna size used, have access to only low bit rates in terms of link budget. This makes them more sensitive to frequency errors. Indeed, the higher the carrier frequency, the greater the error generated by the VCO (Voltage Control Oscillator) used. For example, for a carrier frequency of 10 GHz, a bit rate of 64 kBits/s, a value $\Delta F*Ts$ equal to $10^{-3}$, where $\Delta F$ corresponds to the frequency error (the difference between the frequency of the signal and the theoretical frequency) and Ts is the duration of a symbol, the precision is equal to $dt/t=10^{-8}$. This is far too much for a driver whose price and size are compatible with terminals used by the general public. The solution in which a high stability driver is used is not acceptable from an economic point of view in terminals of this type.

The U.S. Pat. No. 5,170,415 describes a method in which the learning sequence at the beginning of a burst is used firstly to acquire the time synchronization and secondly to obtain the phase synchronization.

The US patent No 2001/0017897 discloses a method that uses a phase weighting method that is inversely proportional to the amplitude to accelerate the convergence of the phase loop in the presence of phase jitter.

The object of the present invention relates especially to a method and device that use especially one or more assumptions relating to frequency deviation and a piece of information on the quality of the symbols in the phase loop.

SUMMARY OF THE INVENTION

The invention relates to a method for demodulating a signal in a packet communications system, the signal comprising at least one burst representing data samples pertaining to one or more users. The method comprises at least one step of phase estimation and tracking during at least the duration of the burst in using a frequency assumption test.

The method may comprise the following steps:
1. For a sample k of the received signal,
2. Generating a correction and tracking signal Scp(i) (by means of an NCO for example) in using a value of frequency deviation $i\Delta F$ and a phase value $d\varphi$,
3. Correcting the input signal Dk in multiplying it by the correction signal Scp(i).
4. Transmitting the frequency-corrected and phase-corrected signal,
5. At a decision step, and
6. At a step of computation of the residual phase $d\varphi$,
7. Using the signal decided on and the corrected signal to estimate the value SNR(i) for the frequency difference indexed i,
8. Integrating the value of the residual phase $d\varphi$ and transmitting it at the tracking and correction signal generation step 2.
9. Bringing about a variation in the value of i and reiterating the steps 1 to 8,
10. For each assumption, taking the sum of the local SNR values per sample.
11. Causing a variation in the value of k, reiterating the steps 1 to 9, 12. Extracting the frequency value indexed i for which the value of the SNR is the optimum.

The invention also relates to a device to demodulate a signal in a packet communications system, the signal comprising at least one burst representing data samples relative to one or more users wherein the device comprises means to implement the method characterized above.

The method according to the invention has, for example, the following advantages:

it uses a minimum number of reference symbols,
it withstands frequency errors by using numerous assumptions of error in frequency,
it can be used for different types of constellation and for all types of packet communications (TDMA, frequency hopping, etc.) or for various radio applications,
it proposes fast and efficient demodulation, especially for small-sized packet transmission in satellite telecommunications.

BRIEF DESCRIPTION OF THE DRAWINGS

Other advantages and characteristics of the present invention shall appear more clearly from the following description, given by way of an illustration that in no way restricts the scope of the invention, along with the appended figures of which.

MORE DETAILED DESCRIPTION

In order to provide for a clear understanding of the method and a demodulator (modem) according to the invention, the following description is given by way of illustration that in no way restricts the scope of the invention for an M-QAM type constellation.

Before giving a detailed description of an exemplary implementation of the device and method according to the invention, a few reminders on the waveforms are given.

Figure 1:
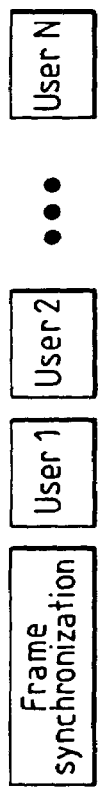
FIG. 1 shows the contents of a TDMA frame.

FIG. 1 describes the contents of a frame comprising bursts from several users, used in multiple-user packet communicationst using the TDMA (Time Division Multiple Access) method in which the frequency-channel band used is shared.

The frame comprises, for example, a dedicated part for the synchronization of the frame and several parts pertaining to user data.

The bursts $U_1, U_2, \ldots U_N$ sent by each user then contain two parts: the payload symbols which contain the bits to be transmitted and a certain number of symbols assembled in what is called a unique word or UW known to the receiver and enabling him to get synchronized. The way in which the symbols are distributed in any burst may be done in different ways depending on the conditions of definition of the waveform (service, bit rate, duration of the burst, efficiency and robustness sought, latency, etc.).

Figure 2:
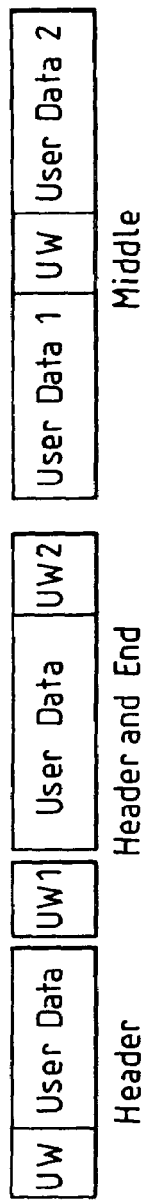
FIG. 2 shows a frame of FIG. 1 in which a UW (unique word) is inserted in the burst.

FIG. 2 shows three examples of the insertion of a unique word or UW in a burst. The position of the UW in the burst may be dictated by different considerations. For example, the UW can be placed:

At the beginning of the burst: this enables the fast processing of the rest of the burst and consequently enables the limiting of the latency due to the processing, At the middle of the burst, this limits the time and frequency drift in dividing the possible duration of the drift by two (in this case, the beginning of the burst is processed by going back in time from the middle of the burst), At the beginning and the end of the burst, this also makes it possible to limit the duration of the drift, The beginning-middle-end distribution makes it possible to gain a factor of four on the drift in question, The unique word may also be uniformly distributed in the burst.

In a waveform capable of transmitting of very wide variety of bit rates, for example in widening the frequency band used while at the same time keeping the burst duration constant in order to simplify overall TDMA management, it is difficult to guarantee the same point of operation as a function of the bit rate. For example, if the bit rate varies from 64 kbits/s to 2 Mbits/s, it is necessary to define a unique word UW that makes it possible to work on N symbols and on 32N symbols if it the proportion of reference symbols in the burst has to be kept constant.

In practice, there will be a tendency to limit the size of the UW to the maximum so as to optimize the bit rate. The tendency therefore is to define a unique word UW that will depend on the constellation used, this constellation dictating the point of operation For example in QPSK (Quadrature Phase Shift Keying), 16 symbols are sufficient for a ½ encoded modulation with a C/N (Carrier Noise) of 3 dB.

Figure 3:
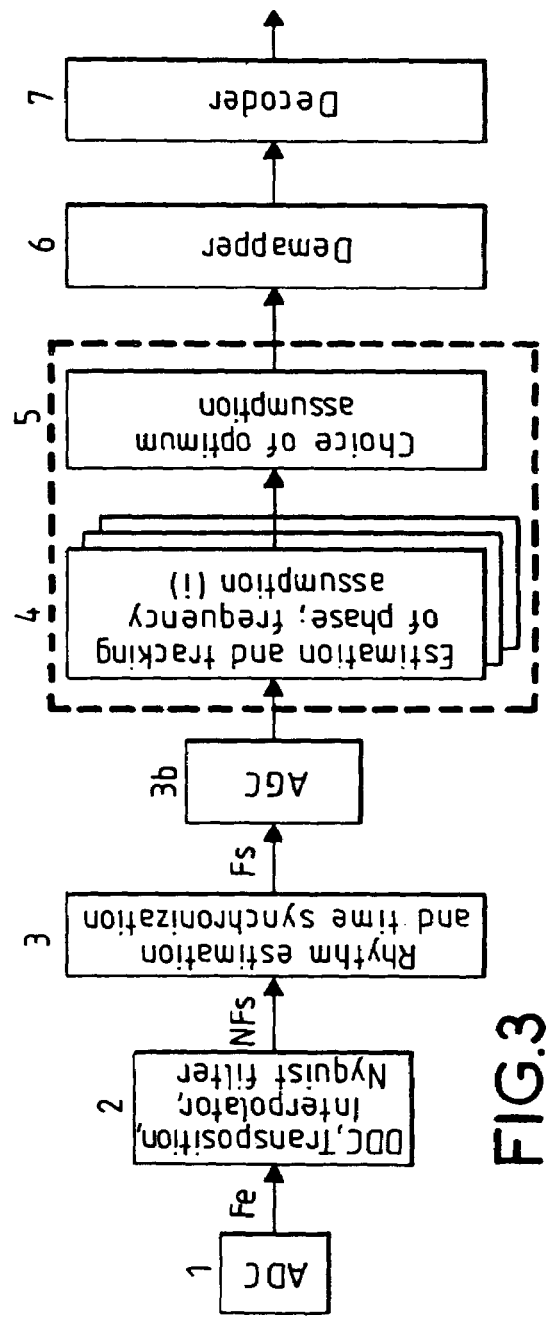
FIG. 3 shows an exemplary architecture of a demodulator according to the invention.
Figure 4A:
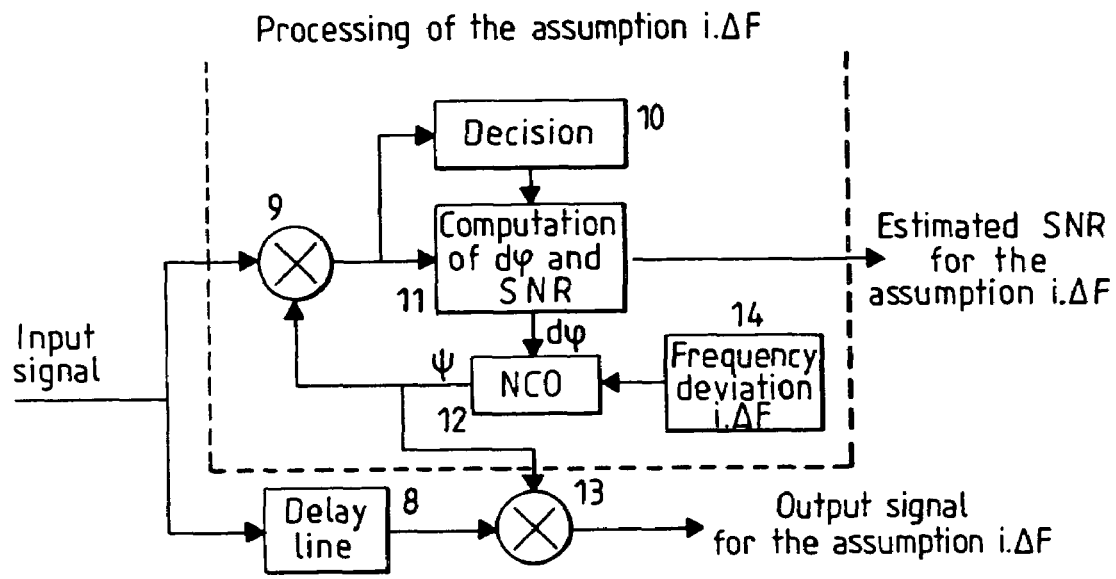
FIG. 4a is a block diagram of phase tracking for the frequency assumption $i\Delta F$.
Figure 4B:
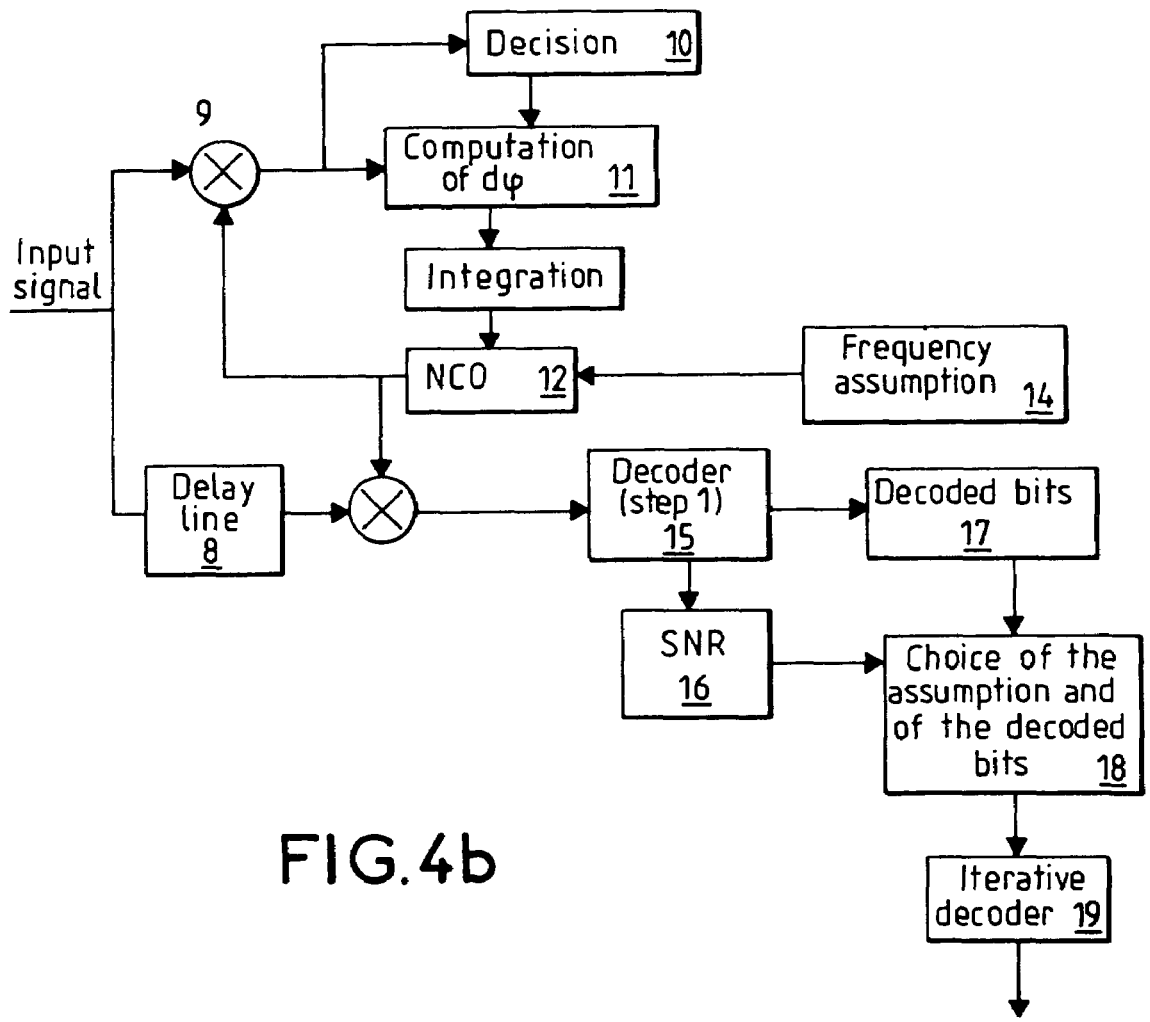
FIG. 4b shows an alternative embodiment of an architecture for which the decoder is located before SNR estimation step.

FIG. 3 gives a (comprehensively) schematic view of an exemplary architecture for a demodulator used to execute the steps of the method according to the invention. It can be placed behind a rhythm estimator: the method works at a rate of one sample per symbol. A level regulation (AGC or automatic gain control) device is used. It works level by level in "feed-forward" mode, the same time as the rhythm estimation (or just behind it).

The signal received by the demodulator is supposed to be sampled at an intermediate frequency at the rate Fe (the value of Fe is chosen according to the usual sampling criteria) by an analog-digital converter 1. The sampled signal is then transposed into baseband and sub-sampled after Nyquist filtering adapted to the rate of the modulation received, 2. In the case of I,Q sampling, the baseband transposition is eliminated. An interpolator followed by a Nyquist filter enables the rhythm estimation algorithm to be given a string of samples that is over-sampled with respect to the symbol rate Fs by a factor N (typically 3 or 4).

The signal NFs is then transmitted to a device 3 enabling a rhythm estimation and a time synchronization. The rhythm synchronization algorithm 3 is coupled with the time synchronization, enabling the burst start symbol to be localized. It is based, for example, on the Meyr algorithm used in "feed-forward" mode. The principle is described, for example, in Oerder and Meyr, "Digital filter and Square Timing Recovery" in IEEE Transactions on Communications, Vol. 36, May 1988. The principle of this algorithm lies in following the variation of the energy of the signal received, which is periodic with a period Ts (the symbol time) and is the maximum at the optimum sampling instant (maximum opening of the eye diagram relative to the modulation). The search is done, for example, by DFT (Discrete Fourier Transform: Fourier coefficient, in this case at the symbol frequency) computation of the modulus of the signal (the energy) on a duration equal to a symbol. The phase of the DFT of the energy measures the delay on the signal. The start of the burst is then detected by correlation with the unique word UW. This correlation also makes it possible to lift the phase ambiguity and due to the modulation. The resulting signal is written as Fs.

The signal Fs is transmitted to an automatic gain control AGC device $3b$ used especially to regulate the mean level Of the signal. In practice, this AGC device is often incorporated into the rhythm estimation and time synchronization block 3. A detection function based for example on the standardized power signal is obtained.

The signal coming from the AGC (the signal is formed by samples at the rate Fe which have been reduced to the rate Fs, i.e. one sample per symbol) is then transmitted to a phase/frequency recovery part 4, 5 of the demodulator. The working of this part consists especially in associating two demodulation techniques:

Frequency tests, discriminated by an estimation of the SNR at output of the demodulation (or in an equivalent way that mean error). The SNR is computed, for example, the basis of a decision on the symbols received based on an estimation of the phase (block 4);

the estimation and the tracking of the phase, weighted by the quality of the symbol received (block 5).

The block 4 is described in detail in FIG. $4a$.

The phase-corrected signal is then transmitted to a de-mapper 6 that enables the conversion of the complex signal into a weighted bit taking account of the constellation used, and then to a decoder 7 at the output of which a decoded signal is obtained.

The use of the phase/frequency recovery part advantageously makes it possible to increase the phase recovery loop band.

The working of the phase/frequency recovery part 4,5 can be subdivided, for example, into three steps:

A tracking of the phase for several assumptions of frequency deviation equal to $i\Delta F$, with $i=-N, \ldots, 0, \ldots N$. On the basis of this tracking operation, an estimation of SNR is made for each assumption of frequency deviation. This step is performed for each assumption of frequency deviation. This step is described, for example, with reference to FIG. $4a$.

The choice of the optimum frequency (assumption) Fopti is made by choosing the assumption of deviation that maximizes the SNR.

The correction of the frequency deviation chosen and the phase on the received signal to enable the demodulation to be performed. This last step may be carried out in different ways.

The block 4/5 according to the invention comprises for example (FIG. $4a$): a multiplier 9 that receives the signal received by the demodulator and a frequency correction and tracking signal generated by an NCO (Numerical Control Oscillator) 12 controlled by a frequency deviation value $i\Delta F$ stored for example in a memory that is not shown. A decision block 10 receives the corrected signal and generates a decided signal transmitted to an SNR computation device and a device 11 for the computation of the residual phase $d\phi$, this device itself being connected to an integrator. The NCO may also comprise a storage function, for example in the variant that uses the initial and final phase values, described here below.

According to one alternative embodiment, the device comprises a delay line 8 that receives the signal received by the demodulator and a multiplier 13 which, in particular, has the function of mixing the delayed signal with the frequency-corrected and phase-corrected signal coming from the NCO. At output of the mixer 13, we have the signal corrected for the assumption $i\Delta F$ (the selected assumption relating to the optimum frequency value).

According to another alternative embodiment shown in FIG. $4b$, the corrected signal is directly transmitted to a decoder 15 producing a decoded signal that will be transmitted to the SNR estimation device 16. The other elements of the device are identical to those given in FIG. $4a$.

The decoder enables the estimation of the incoming error rate, and it is highly sensitive to the phase leaps that occur for the wrong frequency assumptions. The case of the iterative decoder 19 is interesting because only the first half iteration of the iterative decoder is made for the different frequency assumptions, reducing the excess cost of decoding. Furthermore, a hard decision is sufficient for this decoding, and greatly simplifies the complexity of the decoding which no longer necessitates the SISO output, namely the most costly part of the decoding.

The method according to the invention may comprise the following steps:

For a sample k of the received signal, Dk and Rk corresponding to the sample with the index k, 1. Generating a correction and tracking signal $Scp(i,k)$ by means of a NCO (numerically controlled oscillator) in using a value of frequency deviation $i.\Delta F$ and a phase value $d\phi$. For the first passage in the loop, the value of initialization of the residual phase may be chosen according to one of the following two possibilities:
   a) a direct pass is made and the phase of the unique word enables this value to be initialized,
   b) a rear-forward pass is made, as described here below, and the initialization then is of no importance.
2. Correcting the input signal Rk (corresponding to the signal k sampled at the symbol rate) received by the demodulator in multiplying it (for example at the multiplier 9) by the correction signal $Scp(i,k)$,
3. Transmitting the frequency-corrected signal $Scor(i,k)$ to a decision step and also to the block for the computation of the residual phase $d\phi(i,k)$. The decision block produces a decided signal Di,k that is used with the corrected signal Scor to estimate the value of $SNR(i,k)$ for the assumption of deviation indexed i. Storing the pairs of values SNR $(i,k)$,
4. Integrating the value of $d\phi(i,k)$ obtained by means of the corrected signal and the decided signal, and transmitting it to the NCO. The residual phase is used to locally correct the NCO phase generation,
5. Bringing about a variation in the value of the frequency deviation $i=i+1$, so long as the borderline values have not been reached. The number of values taken by i varies, for example, between $-N$ and $+N$. The number N is chosen with respect to the tolerable frequency at input of the demodulator,
6. At the end of these steps, the method possesses a table of values $SNR(i,k)$ for a given sample,
7. Reiterating these steps on all the samples k of the received signal. At the end of this step, the method has a table comprising the SNR values integrated for each sample from which it deduces the best SNR value in integrating it on the totality of the bursts. This leads to the choice of the index i corresponding to the optimum frequency Fopti.

For each assumption of frequency the method takes the sum of the SNR values per sample (the sum is taken of the local SNR values) assumption by assumption. The term "best SNR" or "optimum SNR" is applied to the SNR estimated on the packet, namely when the SNR values of all the samples have been summed up, assumption by assumption.

The signal received by the demodulator and sampled at the symbol rate is corrected in frequency (for each sample, for example, of the part containing the user data) by multiplication in a multiplier 9 with a correction and tracking signal generated by an NCO 12 (Numerical Control Oscillator). The NCO 12 is controlled by a frequency deviation value $i.\Delta F$ 14, that is then multiplied with the incoming signal by a multiplier (9).

These operations of decision and estimation of the SNR are described in detail further below in the description.

Operation of Decision and Phase Computation

The residual phase $d\phi(i,k)$ must be estimated to enable the tracking (this is after the capture or lock-on phase). It is computed as the phase error $d\phi$ between the received signal Rk corrected by the estimated phase $\psi_{(i,k)}$ (phase of the NCO) and the decided symbol of the constellation $D_{(i,k)}$, namely the signal decided on at the end of the decision block, giving:

$$\text{sine } (d\phi_{(i,k)}) = (Rk\char`^D_{(i,k)}/(|Rk|.|D_{(i,k)}|)) \qquad (1)$$

Where $|Rk|$, $|D_{(i,k)}|$ respectively designate the amplitude of the variables Rk, $D_{(i,k)}$, and where $Rk\char`^D_{(i,k)}$ designates the vector product between Rk and $D_{(i,k)}$ or in an equivalent way, the determinant of Rk and $D_{(i,k)}$ that is $X_A.Y_B - Y_A.X_B$, with $Rk = X_A + i.Y_A$ and $Dk = X_B + i.Y_B$, the coordinates x, y correspond to the coordinates of the figure.

For the small angles $d\phi_{(i,k)}$, which is the case for the optimum assumption of frequency deviation i, it can be assumed that the moduli of Rk and $D_{(i,k)}$ are close to unity (indeed $D_{(i,k)}$ is the modulus equal to unity by construction and Rk has a modulus close to unity through the AGC unit referenced 3b in the figure, and Sine $(d\phi) \approx d\phi \approx (Rk\char`^D_{(i,k)})$ may be chosen.

Figure 5:
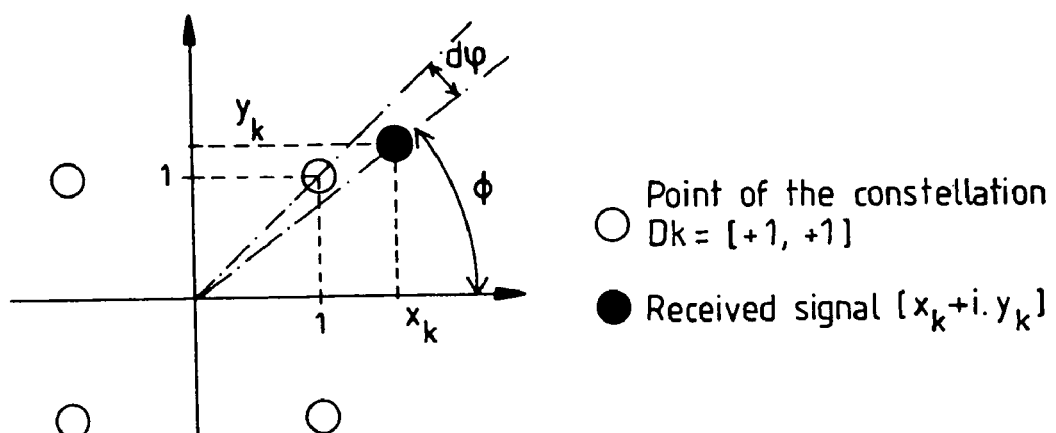
FIG. 5 shows the geometry for a four-state 4-QAM constellation.

FIG. 5 explains this computation in the simple case of the 4-QAM constellation.

Figure 6:
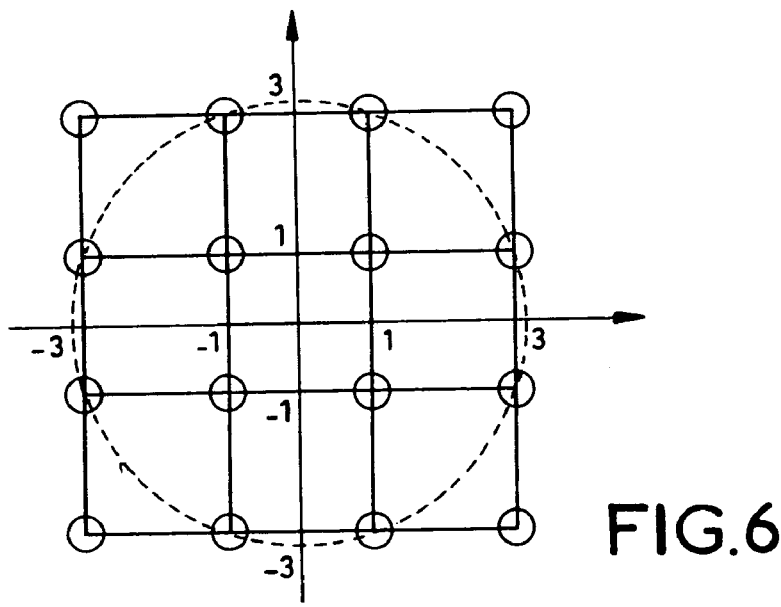
FIG. 6 shows a 16-state 16-QAM constellation.

In the more general case of the m-QAM (with $m = 2^q$) where the real and imaginary parts of the points of the constellation take values $[-(2^{q/2}-1), \ldots -1, 1, \ldots 2^{q/2}-1])$ the decision circuit 10 and the decided values $(X_{Dk}, Y_{Dk})$ are simple and integer values. The computation of $d\phi_{(i,k)}$ is therefore simple and the loop gain G takes account of the mean of the variable $1/|Dk|$. A 16-state constellation is given in FIG. 6. In this case, the mean amplitude is equal to $\sqrt{10}$ and the circle shows that half of the points of the constellation actually have an amplitude equal to this mean amplitude.

In practice, the value of the phase reinjected into the phase loop may be computed or tabulated. The tabulation is an efficient solution for complex modulations, when the decision zones (Voronoï) are complex. A tabulation on a quarter plane (x>=0, y>=0) is the least expensive solution for all the constellations having a symmetry relative to the axes.

Computation of the Phase of the NCO

The phase error $d\phi_k$ (also called the residual phase) is injected into the phase loop of the NCO at 12 according to the relationship:

$$\psi_{(i,kl)} = \psi_{(i,k)} + G.F(\phi_k, \rho_k).d\phi_{(i,k)} + dF \qquad (2)$$

where G is the gain of the loop, dF corresponds to the phase increment induced by the tested assumption of frequency deviation $i.\Delta F$ and $F(\phi,\rho)$ is the weighting function of the residual phase.

The weighting function $F(\phi,\rho)$ may also be written as if it were a function of the Cartesian coordinates of the received signal $F(x,y)$. The ease with which the computation of F is implemented determines which coordinates (whether Cartesian or polar) will be used, with $x+i.y = \rho e^{i\phi}$. Hereinafter, the two notations will be used without distinction. The use of the weighting is chiefly motivated by the fact that it substantially reduces the number of phase leaps at output of the demodulator.

The loop gain G is set so as to enable the tracking of the phase variation due to fluctuations other than those induced by the frequency error (in which the drifts induced by the VCO* are included). A low gain is used when the fluctuations are low and enable robust convergence; high gain enables a rapid tracking of fluctuations but leaves a greater standard error deviation at output.

As above, the weighting function can be tabulated. The higher the SNR, the greater the confidence. The tabulation is then done by taking account of an S curve relating to the weighting of the phase as a function of the quality of the signal received.

The SNR used for this weighting is that of the threshold at which the modem must work. The size of the weighting table (which may be a ROM or a RAM) is typically equal to 26 bits for X>0 and 6 bits for Y>0. This 6-bit size is appropriate for modulations up to 64-QAM. For higher-order constellations, the use of weighting is not necessary (because the gain provided by the weighting of the phase error is almost a non-existent), and the direct computation described in detail here below proves to be sufficient. The direct computation is an often less costly approach, but makes it more difficult to compute the weighting to be applied to the phase.

A value close to the theoretical value for the small signals in Q-PSK of $F(\phi,\rho)$ for the QPSK is given by:

$$F(\phi,\rho) = \rho.\phi. \ (\pi/2-\phi).16/\pi^2 \qquad (3)$$

with $d\phi$ expressed in radians. The error-free phase is $\pi/4$. We therefore have $F(\pi/4,1) = 1$. The maximum error is attained when the phase is equal to 0 or $\pi/2$, in which case the function is zero. This function is given on the phase weighting curve or function of FIG. 7. The introduction of the linear factor $\rho$ in the function makes it possible to take account of the fact that the phase is of better quality when the signal is a high-amplitude signal, and that its reliability is especially low to the extent that its amplitude is low (the value approached is that of zero amplitude where the phase is no longer very significant). Of course, this holds only after a gain control which brings the mean amplitude to a value equal to unity.

If $d\phi$ in full revolution is expressed more naturally (with respect to the hardware implementation and the output $\psi_k$ of the NCO) the equation (3) becomes:

$$F(\phi,\rho) = \rho.\phi.(1/4-\phi).64 \qquad (4)$$

In the Cartesian plane, a simpler approximation of $F(\phi,\rho)$ may be given by the distance to the axis of decision. In 4-QAM for example, the decision is (+/−1, +/−1), the distance to the axis of decision is abs(x).abs(y) while the decision is (sign(x),sign(y)).

The weighted phase error $\phi.d\phi$ is then equal to (x.sign(y)−y.sign(x)).abs(x).abs(y). Here too, an automatic gain control in reception is assumed to have been used. This brings the points of the constellation to a unit value, so as not to distort the computation of the loop band.

The distance to the axis of decision is the natural input of an error correction decoder with weighted input. For the complex constellations, this information must be generated, most usually by a table giving the weights of the different bits as a function of the pair (X,Y). Computing this value twice is then avoided.

The weighting naturally tends to (slightly) diminish the gain of the phase loop when the signal-to-noise ratio diminishes.

Computation of Quality: Choice of the Frequency Value; Determining the Optimum Frequency The criterion of choice between the various assumptions of frequency deviation (i$\Delta$F) is based on a minimizing of the estimation of the quality of the result of convergence and tracking of the phase loop on the totality of the burst on the different assumptions of frequency deviation. This quality is evaluated, for example, by summing up the distances between the point of the constellation decided and the current signal (in reality, this is only an approximation of SNR):

$$SNR_{(i,k)} = \Sigma_k |R_k - D_{(i,k)}|^2 \qquad (5)$$

k is the temporal index (on the samples), i is the frequency index (on the frequency assumptions); Rk the received symbol, depends only on the time k, the other variables depend on the time and the past conditioned by the frequency assumption, giving again the mean quadratic error for a given frequency assumption. The sum is taken nominally on the totality of the burst. If there is a problem of latency of processing, the operation can be limited to a part of the burst it being known, at the same time, that this will impair the overall performance of the estimator.

For the minimizing, a fast development leads to the relationship to be optimized:

$$SNR = \Sigma |Rk|^2 + \Sigma |Dk|^2 - 2Re(\Sigma Rk.Dk^*), \qquad (6)$$

where Dk* is the conjugate complex of Dk.

For a 4-QAM, the first two terms are independent of the phase and the frequency, and the minimizing takes place only on the third term, which must therefore be maximized. As in the case of the phase computation, the term Rk.Dk* is simple to compute and is enough to enable a decision to be taken on the assumption of frequency deviation. For higher-order constellations, the development of $\Sigma |Rk-Dk|^2$ does not bring any major gain. In the event of recourse to a table for the computation of the phase error, the value $|Rk-Dk|^2$ can be read simultaneously.

Parallelization of the Computations

One of the major advantages resulting from this way of processing the estimation and the phase/frequency tracking is its adaptation as a function of the transmitted bit rate. Indeed, if the bit rate is high, the resistance of the demodulator to the phase error is high because the elementary error during a symbol is low and can be easily tracked and corrected, with assumptions between −N.□F and +N.□F. If the bit rate is reduced by a factor of 2, twice, it is possible to make more assumptions of frequency deviation within the same period of time and choose the optimum assumption with the same hardware resource (using it several times for an identical time period).

The different assumptions of frequency deviation are made with "resource sharing". When the bit rate falls, the number of assumptions may rise, enabling a constant range of frequency error (through an increase in the number of assumptions) and a constant loop band (in numbers of symbols and hence in quantity of information).

A software type implementation is, for example, the following:

For k {all the symbols}
  For dF {all the frequency assumptions}
    X[k]+i.Y[k]=(cos(i.Psi[k])+i.sin(i.Psi[k]))*(x[k]+i.y[k]);
    Xd[k]+i.Yd[k]=decision(X[k]+i.Y[k])
    dPhi[k,dF]=phase(Xd[k]+i.Yd[k]−(X[k]+i.Y[k]))
    Psi[k+1,dF]=Psi[k,dF]+G. F(X[k],Y[k]).dPhi[k,dF]+dF
    SNR[k+1,dF]=SNR[k,dF]+‖X[k]+i.Y[k]−Xd[k]−i.Yd[k]‖$^2$
  End of frequency loop
End of symbol loop Here the letter i designates the complex number (0.1) and not the current frequency deviation assumption dF.

In this implementation, the signal entering at the instant k is written as x[k]+i.y[k], the phase error corrected signal is X[k]+i.Y[k], the decision function returns to the point of the decided constellation, the phase function x+iy) returns to the phase of the complex number x+i.y, the function F is the hosen weighting function, and the quality is estimated iteratively in order to prevent the storage of the intermediate variables.

It is therefore necessary to be able to manage 2N+1 states of the NCO (Psi[k,dF]) and the SNR states. The final computation of Psi[N,dF]−Psi[0,dF] gives a fine estimation of the residual phase error. The storage of the intermediate results for each value of dF: (X,Y), (Xd,Yd), dPhi[k,dF], Psi[k,dF], SNR[k,dF] is not obligatory; a last assumption for the value of the frequency (after the choice of the winner) enables the recomputation of all these values for the assumption corrected for the residual error. This simply requires the storage of an additional burst of samples, and the ability to work on two distinct bursts simultaneously. It can furthermore be imagined that the value of frequency can be refined in taking the value of the residual phase on the totality of the burst and completing the frequency correction of the assumption chosen so as to cancel this residual error.

In a system using a block code adapted to the burst, it can be envisaged that the ultimate decision criterion is the error rate at output of the decoder 7 (FIG. 3). In this case it is necessary to decode the outputs of the N assumptions tested, thus greatly increasing the computation power necessary. In this case, the final metrics of the decoder are used (the assumption made here is that of a "soft decoder" at the end of the block). This replaces the computation of the SNR sample by sample.

The decision criterion may be an indicator of quality coming from the decoder. The quality indicator is, for example, an indicator of speed of convergence of the decoding algorithm, a consistency check word (or CRC=Cyclic Redundancy Check) or any other means offered by the encoder (non-decoding for a REED SOLOMON code, an appreciation of error rate at input of the decoder, etc.).

Figure 8:
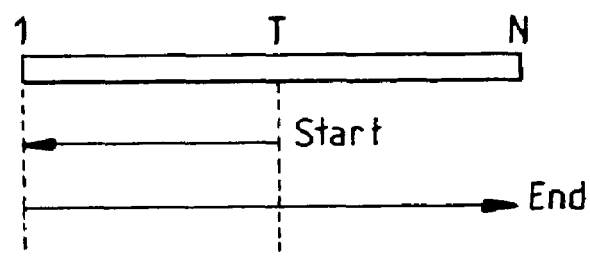
FIGS. 8 to 13 show results obtained by the implementation of the method.

In practice, to be able to guarantee the convergence of the phase loop at the end of the burst in the case of very short-term bursts, it is useful to initialize the loop by going back along the time axis from a point taken that is sufficiently long from the start of the burst. This procedure is described in detail with reference to FIG. 8.

It is assumed that the burst contains N symbols. The loop is initialized at the level of the symbol number T, and the symbols are injected into the loop in going back in time after the first symbol. The burst is then processed in the normal direction (in reversing, of course, the sign of the frequency in the correction phase generating NCO (12)). This procedure enables the processing of the smaller bursts (in taking for example T=N), and very long bursts (T<<N). In the latter case, the computation power is not excessively penalized: this is done by restricting the value of T to a strictly necessary value.

Figure 9:
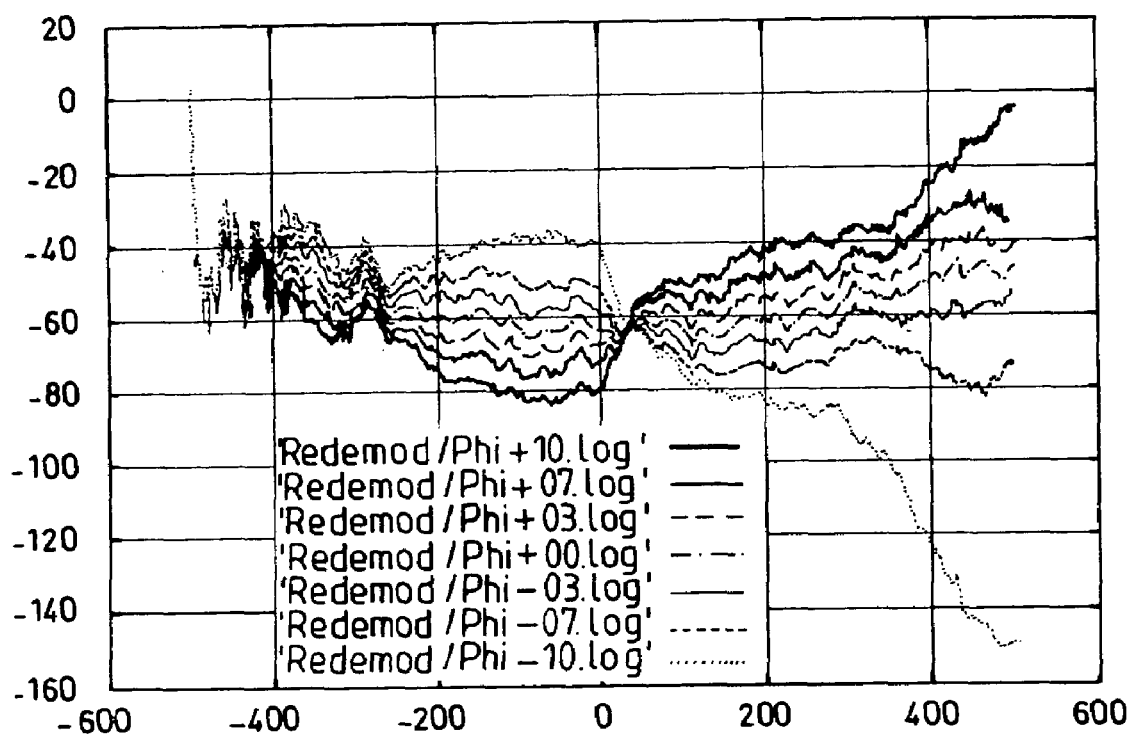

An exemplary phase path is given in FIG. 9.

Here we can see the effect of the phase correction as a function of the assumptions taken into account (seven assumptions here). The starting phase, to the left, is taken to be equal to zero at the point T (here T=N=512 symbols). It can be seen in this figure that the phase assumption Phi—03 (which corresponds in this computation to a relative frequency deviation of $\Delta F.Ts=3.10^{-4}$) is the one that minimizes the residual phase error between the first point and the last point of the burst.

Figure 7:
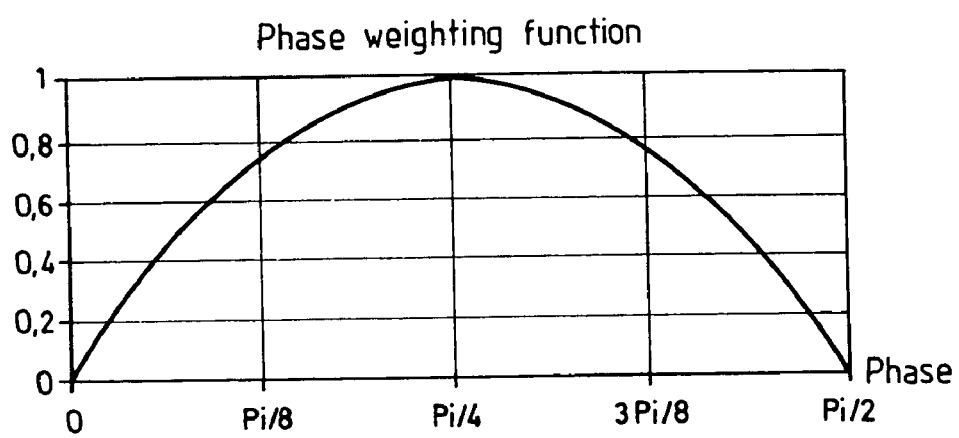
FIG. 7 shows an exemplary weighting of the phase for a 4-QAM constellation.
Figure 10:
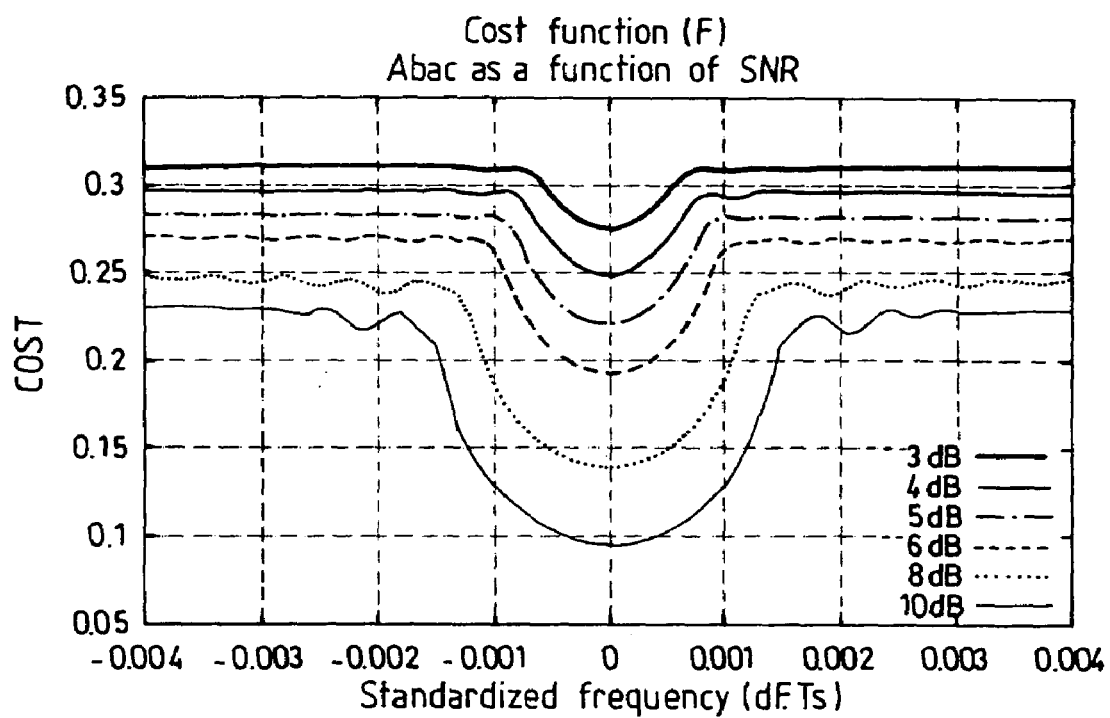
Figure 11:
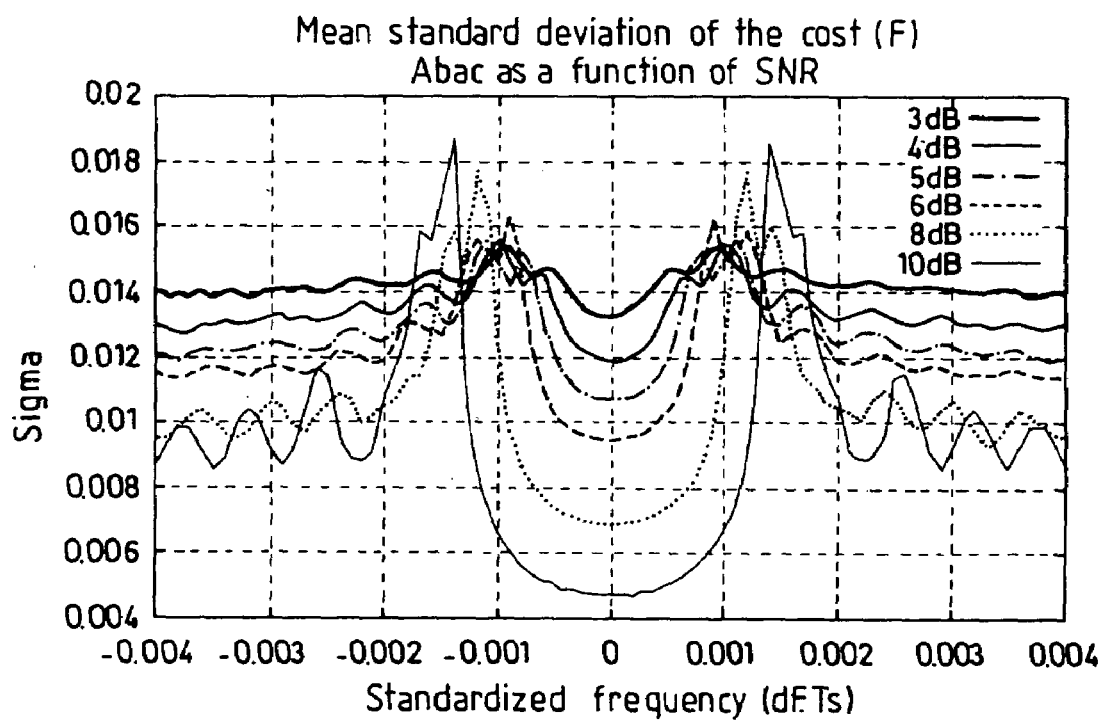

The use of the function shown in FIG. 7 gives an SNR value represented by the curves of FIG. 10 at the end of the flat-curve portion or plateau. This figure shows the value of the mean SNR as a function of the assumption of standardized frequency deviation (x-axis) and of the true SNR (7 curves for the SNR with a value 3 at 10 dB).

The following were the assumptions made to prepare this figure:

loop gain G=1/30
header 16 symbols, data 378 symbols

The standard deviation on the mean SNR at the end of the plateau is given in FIG. 10.

Figure 12:
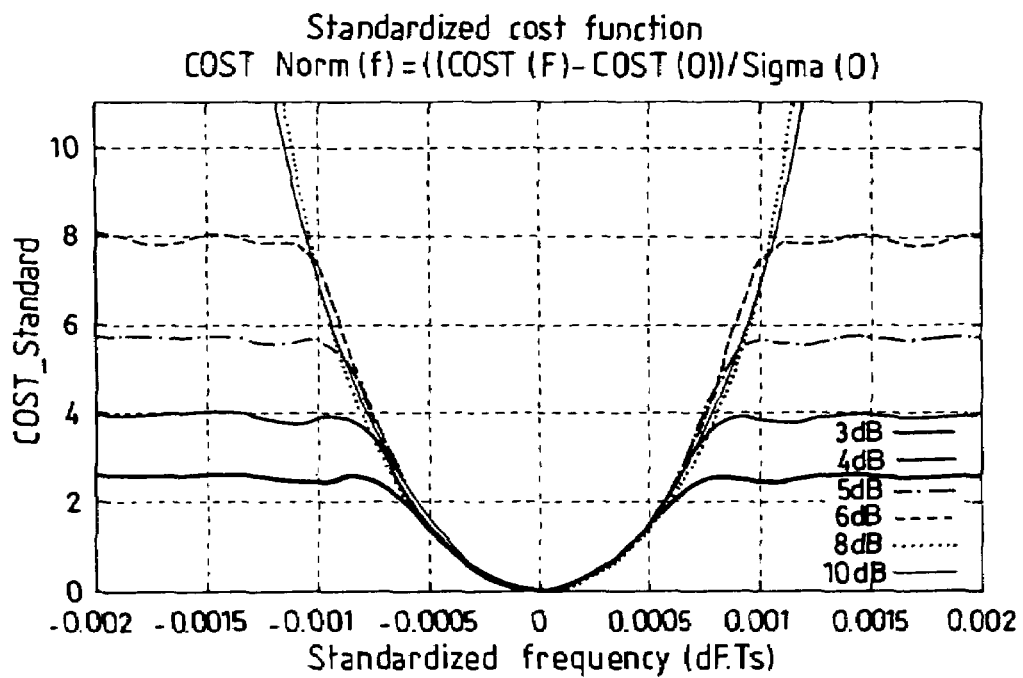

To conclude, the standardized cost function (corrected by its minimum value and multiplied by the means standard deviation), is given in FIG. 12.

This figure can be interpreted as giving the range of deviation in frequency of operation of the method. Indeed, the horizontal part of the curves gives, for a given SNR value, the risk of disengagement of the modem (in terms of standardized value, this is equivalent to the mean standard deviation of the random variable SNR and is related to the probability of disengagement).

Figure 13:
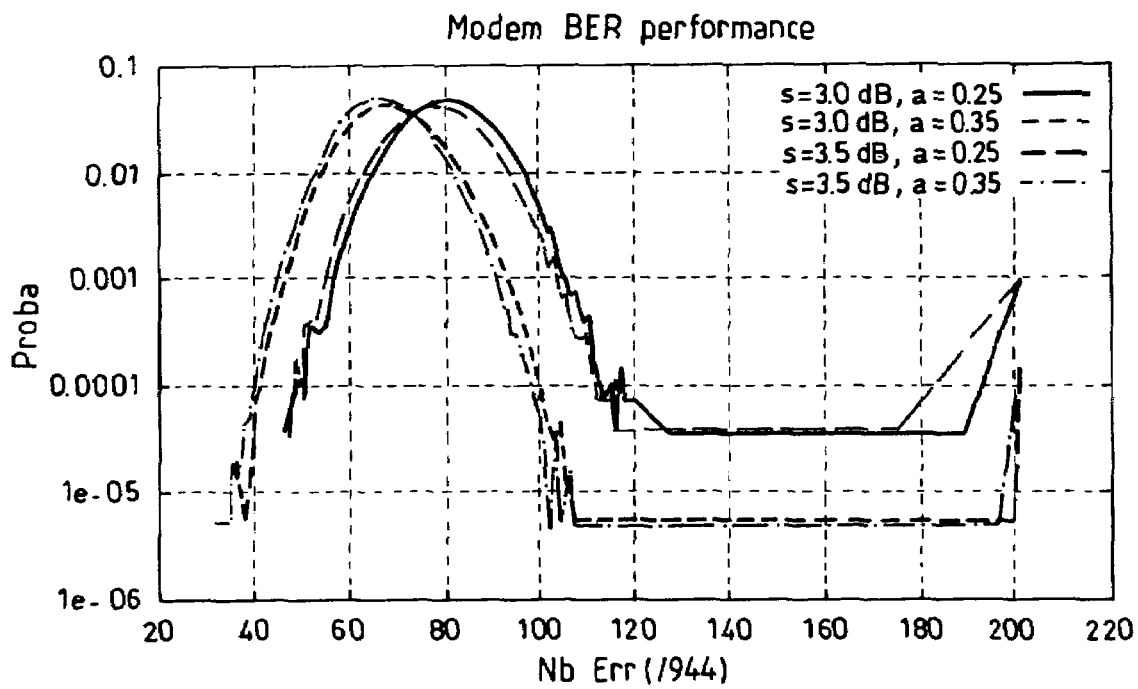

The histogram of the errors resulting therefrom is given in FIG. 13.

The associated conditions of simulation are:
QPSK
484-symbol packet formed by a 12-symbol "UW" followed by a data packet of symbols (giving 944 payload bits)
roll off 0.25 and 0.35
Search on $dF.TS=+/-10^{-3}$
7 assumptions with a pitch of $3.10^{-4}$
C/N=3.0 dB and 3.5 dB Loop on about 60 symbols Taking a limited search (a search on $dF.TS=+/-5.10^{-4}$) with three assumptions at a pitch of $3.10^{-4}$ and a loop on about 90 symbols gives a result wherein there is no longer any phase leap at a C/N of 3.5 dB (nothing on 200000 bursts), and similarly at a C/N of 3 dB (nothing on 30000 bursts).

What is claimed is:

1. A method of demodulating a signal in a packet communications system, the signal including at least one burst representing data samples pertaining to one or more users, the method comprising the steps of:
    (a) phase estimation and tracking during at least the duration of the burst by using a frequency assumption test;
    (b) for a sample k of the received signal generating a correction and tracking signal Scp(i) by using a value of frequency deviation idF and a residual phase value dφ;
    (c) correcting an input signal Rk by multiplying it by a correction and tracking signal Scp(i);
    (d) transmitting the frequency-corrected and phase-corrected signal;
    (e) at a step of computation of the residual phase value dφ, using a reference constellation signal Dk and the frequency-corrected and phase-corrected signal to estimate the value SNR(i) for index;
    (f) integrating the residual phase value dφ and transmitting the residual phase value dφ during step (b);
    (g) determining a variation in the value of index i and reiterating steps (a) to (f);
    (h) for each assumption, taking the sum of the local SNR(i) values per sample, and determining a variation in the value of k; and
    (i) extracting the frequency deviation value indexed i for which the value of the SNR is optimum; wherein the generation of correction and tracking signal is given by:

$\psi_{k+1}=\psi_k+G.F(\phi_k, \rho_k).d\phi_k+dF$ where $F(\phi,\rho)$ is a weighting function;

$\psi_k$ is an estimated phase;
G is the loop gain;
F is the weighting function;
$d\phi_k$ is the phase error; and
dF is the frequency deviation assumption.

2. The method according to claim 1, wherein the value of the SNR is obtained by minimizing the following expression:

$SNR=\Sigma_k|Rk-Dk|^2$.

3. The method according to claim 1, wherein said extracting step is executed iteratively.

4. The method according to claim 1, wherein the method is executed for the optimum frequency and the corresponding phase residual value is determined.

5. The method according to claim 4, wherein a delay is introduced into a signal, sample by sample, and wherein the phase-corrected and frequency-corrected signal obtained for the optimum frequency value is applied.

6. The method according to claim 1, wherein the phase-corrected and frequency-corrected signal is transmitted to a decoding step before the estimation of the value of the SNR on the decoded symbols.

7. The method according to claim 6, further comprising applying a decision criterion to each signal output from the decoding step, the applied decision criterion being a quality indicator.

8. The method according to claim 7, wherein the quality indicator is an indicator of speed of convergence of the decoding algorithm, a consistency check word (or CRC=Cyclic Redundancy Check) or any other means offered by the encoder (non-decoding for a REED SOLOMON code, an appreciation of error rate at input of the decoder, etc.).

9. A device to demodulate a signal in a packet communications system, the signal comprising at least one burst representing data samples relative to one or more users wherein the device comprises means to implement the method according to claim 1.

* * * * *